US012787910B2

(12) United States Patent
Jagow et al.

(10) Patent No.: US 12,787,910 B2
(45) Date of Patent: Nov. 10, 2026

(54) FLOW CONTROL APPARATUS FOR AGRICULTURAL PRODUCT DISTRIBUTION SYSTEM

(71) Applicant: Bourgault Industries Ltd., St. Brieux (CA)

(72) Inventors: Scot Jagow, St. Brieux (CA); Scott Gerbrandt, St. Brieux (CA)

(73) Assignee: Bourgault Industries Ltd., St. Brieux (CA)

( * ) Notice: Subject to any disclaimer, the term of this patent is extended or adjusted under 35 U.S.C. 154(b) by 134 days.

(21) Appl. No.: 18/625,014

(22) Filed: Apr. 2, 2024

(65) Prior Publication Data

US 2024/0324491 A1 Oct. 3, 2024

Related U.S. Application Data

(60) Provisional application No. 63/456,653, filed on Apr. 3, 2023.

(51) Int. Cl.
*A01C 7/08* (2006.01)

(52) U.S. Cl.
CPC .............. *A01C 7/082* (2013.01); *A01C 7/084* (2013.01)

(58) Field of Classification Search
CPC ...... B65G 53/528; B65G 53/56; B65G 51/24; A01C 7/082
USPC .................................. 406/182; 111/174–175
See application file for complete search history.

(56) References Cited

U.S. PATENT DOCUMENTS 5,265,547 A * 11/1993 Daws ..................... A01C 7/087 111/175
5,980,163 A 11/1999 Gregor et al.
6,047,652 A * 4/2000 Prairie .................. A01C 7/081 406/146
6,213,690 B1 4/2001 Gregor et al.
6,320,183 B1 * 11/2001 Gregor .................. A01C 7/044 250/223 R
6,834,599 B1 12/2004 Fuessel et al.
6,883,445 B2 * 4/2005 Mayerle ................ A01C 7/042 111/175
7,137,759 B1 * 11/2006 Ambs ................... B65G 37/00 406/89

(Continued)

*Primary Examiner* — Joseph A Dillon, Jr.
(74) *Attorney, Agent, or Firm* — SMART & BIGGAR LP; James Raakman

(57) ABSTRACT

A flow control apparatus for an agricultural product distribution system includes a bypass valve having a valve inlet for receiving metered product from a metering device, and a closure member movable between bypass and distribution positions. The flow control apparatus further includes a bypass conduit downstream of the bypass valve for receiving the metered product when the bypass valve is in the bypass position, to expel the metered product from the distribution system. The flow control apparatus further includes a transfer manifold downstream of the bypass valve. The transfer manifold includes a plurality of transfer outlets and a transfer channel for receiving the metered product when the bypass valve is in the distribution position. Each of the transfer outlets is in fluid communication with a respective pneumatic distribution line. The transfer manifold further includes at least one diverter valve for selectively placing the transfer outlets into and out of fluid communication with the transfer channel.

19 Claims, 11 Drawing Sheets

(56) References Cited

U.S. PATENT DOCUMENTS

| | | | | |
|---|---|---|---|---|
| 7,555,990 | B2 * | 7/2009 | Beaujot | A01C 21/005 111/175 |
| 8,001,915 | B2 | 8/2011 | Friggstad | |
| 8,141,504 | B2 * | 3/2012 | Dean | A01C 7/081 111/179 |
| 8,371,238 | B2 * | 2/2013 | Dean | A01C 7/081 111/179 |
| 8,635,963 | B2 * | 1/2014 | Friggstad | A01C 7/084 111/175 |
| 8,757,073 | B2 | 6/2014 | Beaujot et al. | |
| 9,295,191 | B2 * | 3/2016 | Jagow | A01C 7/082 |
| 9,363,942 | B2 | 6/2016 | Bent et al. | |
| 9,615,505 | B2 | 4/2017 | Bent et al. | |
| 9,648,801 | B2 | 5/2017 | Borkgren et al. | |
| 9,686,903 | B2 * | 6/2017 | Roberge | A01C 7/206 |
| 9,801,333 | B2 * | 10/2017 | Roberge | B65G 11/066 |
| 9,944,473 | B2 * | 4/2018 | Bent | A01C 14/00 |
| 10,021,826 | B2 | 7/2018 | Meyer et al. | |
| 10,058,022 | B2 | 8/2018 | Zacharias et al. | |
| 10,093,492 | B2 * | 10/2018 | Brewster | B65G 53/66 |
| 10,149,427 | B2 * | 12/2018 | Bourgault | A01C 7/082 |
| 10,362,725 | B2 * | 7/2019 | Johnson | A01C 7/084 |
| 10,631,454 | B2 | 4/2020 | Meyer et al. | |
| 10,694,660 | B2 | 6/2020 | Harmon | |
| 10,906,757 | B2 * | 2/2021 | Kramer | B29B 9/16 |
| 11,091,327 | B2 * | 8/2021 | Kelly | B65G 53/04 |
| 11,229,158 | B1 * | 1/2022 | Janelle | F16K 31/60 |
| 11,284,560 | B2 * | 3/2022 | Cowan | A01C 5/062 |
| 11,305,951 | B2 | 4/2022 | Harmon | |
| 11,352,222 | B2 * | 6/2022 | Trushin | A01C 7/084 |
| 11,547,038 | B2 * | 1/2023 | Mukhopadhyay | A01C 7/082 |
| 11,708,648 | B2 * | 7/2023 | Tankersley | F16K 27/00 28/271 |
| 11,711,998 | B2 * | 8/2023 | Harmon | A01C 7/124 406/1 |
| 11,745,959 | B2 * | 9/2023 | Borkgren | A01C 7/082 111/174 |
| 11,832,549 | B2 * | 12/2023 | Janelle | A01C 15/003 |
| 11,944,590 | B2 * | 4/2024 | Matsuki | G01N 33/15 |
| 11,964,213 | B2 * | 4/2024 | Braun | A63G 31/007 |
| 12,089,526 | B2 * | 9/2024 | Maro | A01C 7/081 |
| 12,239,042 | B2 * | 3/2025 | Karlsson | A01C 7/081 |
| 12,306,644 | B2 * | 5/2025 | Gundlach | G01F 15/005 |
| 12,352,733 | B2 * | 7/2025 | Beals | B01F 33/821 |
| 12,514,150 | B2 * | 1/2026 | Ryan | A01C 7/084 |
| 2010/0122647 | A1 * | 5/2010 | Memory | A01C 7/102 221/278 |
| 2011/0293380 | A1 * | 12/2011 | Stuke | B29B 7/603 406/122 |
| 2012/0132115 | A1 * | 5/2012 | Dean | A01C 7/081 111/14 |
| 2012/0174844 | A1 * | 7/2012 | Friggstad | A01C 7/125 111/178 |
| 2014/0130724 | A1 * | 5/2014 | Friggstad | A01C 7/20 111/174 |
| 2015/0359165 | A1 * | 12/2015 | Roberge | A01C 7/082 414/304 |
| 2016/0021815 | A1 * | 1/2016 | Redman | A01C 7/206 111/149 |
| 2018/0077856 | A1 * | 3/2018 | Rice | A01C 7/088 |
| 2019/0291977 | A1 * | 9/2019 | Kramer | B29B 9/16 |
| 2024/0269751 | A1 * | 8/2024 | Kopschinski | B22F 12/57 |
| 2025/0221330 | A1 * | 7/2025 | Surborg | A01C 15/007 |
| 2025/0338791 | A1 * | 11/2025 | Jagow | A01C 7/088 |

* cited by examiner

FLOW CONTROL APPARATUS FOR AGRICULTURAL PRODUCT DISTRIBUTION SYSTEM

CROSS-REFERENCE TO RELATED APPLICATION

This application claims the benefit of U.S. Provisional Patent Application No. 63/456,653 filed Apr. 3, 2023, the entirety of which is incorporated herein by reference.

FIELD

The teaching disclosed herein relates generally to apparatuses and methods for delivering agricultural product, such as, seed, fertilizer, etc. from a tank to an agricultural implement for application to a field. More specifically, the teaching disclosed herein is directed to a flow control apparatus for an agricultural product distribution system that includes tank cleanout and meter calibration features upstream of product distribution features.

INTRODUCTION

U.S. Pat. No. 6,834,599 (Fuessel) discloses an improved collector assembly comprising a generally hollow body mounted below a product supply tank for receiving plural streams of materials metered from the tank. Individual upright passages through the body corresponding in number to the metered streams from the tank receive the gravitating product streams and direct each stream into either or both of an upper loading zone and a lower loading zone in the passage. A diverter valve associated with each upper loading zone can be set to close off the upper loading zone entirely while opening only the lower zone or closing off the lower loading zone while opening only the upper loading zone. Thus, air streams passing transversely through the upper and lower loading zones respectively can be supplied with variable amounts of metered product, depending upon the position of the diverter valve within each passage. By providing multiple supply tanks and multiple collector assemblies, various product delivery scenarios can be achieved including single shoot, double shoot, and triple shoot effects. In a preferred form of the invention, all diverter valves are actuated by a common actuating mechanism for simultaneous adjustment.

U.S. Pat. No. 9,363,942 (Bent) discloses a run selection mechanism for selectively directing the flow of particulate material from an air cart. The mechanism includes a chute for receiving metered particulate material. The chute has an output. A first primary conduit has an output communicating with a first pneumatic primary run and a second primary conduit has an output communicating with a second pneumatic primary run. A selector selectively directs the metered particulate material to one of the output of the chute, the first pneumatic primary run and the second pneumatic primary run.

SUMMARY

The following summary is intended to introduce the reader to various aspects of the applicant's teaching, but not to define any invention.

In one aspect, a flow control apparatus for an agricultural product distribution system is disclosed. The flow control apparatus includes a bypass valve having a valve inlet for receiving metered product from a metering device, and a bypass closure member movable between a bypass position and a distribution position. The flow control apparatus further includes a bypass conduit downstream of the bypass valve for receiving the metered product when the bypass closure member is in the bypass position, to expel the metered product from the distribution system. The flow control apparatus further includes a transfer manifold downstream of the bypass valve. The transfer manifold includes a transfer channel for receiving the metered product when the bypass closure member is in the distribution position. The transfer channel is separate from the bypass conduit. The transfer manifold further includes a plurality of transfer outlets. Each of the transfer outlets is in fluid communication with a respective one of a plurality of pneumatic distribution lines. The transfer manifold further includes at least one diverter valve for selectively placing the transfer outlets into and out of fluid communication with the transfer channel.

In some examples, the bypass valve includes a bypass outlet in fluid communication with the bypass conduit, and a distribution outlet separate from the bypass outlet and in fluid communication with the transfer channel.

In some examples, when the bypass closure member is in the bypass position, the valve inlet is in fluid communication with the bypass outlet and is isolated from the distribution outlet.

In some examples, when the bypass closure member is in the distribution position, the valve inlet is in fluid communication with the distribution outlet and is isolated from the bypass outlet.

In some examples, the transfer manifold includes a transfer inlet in fluid communication with the distribution outlet.

In some examples, the plurality of transfer outlets includes a lower transfer outlet and at least a first upper transfer outlet disposed at an elevation above the lower transfer outlet and below the transfer inlet. The lower transfer outlet is coupled to a lower distribution line of the plurality of pneumatic distribution lines, and the first upper transfer outlet is coupled to a first upper distribution line of the plurality of pneumatic distribution lines.

In some examples, the flow control apparatus further includes a lower transfer zone in the transfer manifold proximate to, and in fluid communication with, the lower transfer outlet for transferring metered product to the lower distribution line.

In some examples, the lower transfer zone includes a closed bottom end of the transfer channel.

In some examples, the flow control apparatus further includes a first upper transfer zone in the transfer manifold proximate to, and in fluid communication with, the first upper transfer outlet for transferring metered product to the first upper distribution line. The first upper transfer zone is disposed at an elevation above the lower transfer zone.

In some examples, the transfer channel extends vertically through the transfer manifold from the transfer inlet to the lower transfer zone and includes a first passageway extending beside the first upper transfer zone.

In some examples, the at least one diverter valve includes a first diverter valve having a first diverter valve closure member movable between a first closed position, in which the first upper transfer zone is isolated from the transfer channel and the first passageway is unblocked for delivery of metered product past the first upper transfer zone to the lower transfer zone, and a first open position, in which the first upper transfer zone is in fluid communication with the transfer channel and the first passageway is blocked.

In some examples, the plurality of transfer outlets further includes a second upper transfer outlet in the transfer manifold disposed at an elevation above the first upper transfer outlet. The second upper transfer outlet is coupled to a second upper distribution line of the plurality of pneumatic distribution lines.

In some examples, the flow control apparatus further includes a second upper transfer zone in the transfer manifold proximate to, and in fluid communication with, the second upper transfer outlet for transferring metered product to the second upper distribution line. The second upper transfer zone is disposed at an elevation above the first upper transfer zone.

In some examples, the transfer channel includes a second passageway extending beside the second upper transfer zone.

In some examples, the at least one diverter valve further includes a second diverter valve having a second diverter valve closure member movable between a second closed position, in which the second upper transfer zone is isolated from the transfer channel and the second passageway is unblocked, and a second open position, in which the second upper transfer zone is in fluid communication with the transfer channel and the second passageway is blocked.

In another aspect, a flow control apparatus for an agricultural product distribution system is disclosed. The flow control apparatus includes a bypass valve having a valve inlet for receiving metered product from a metering device, a bypass outlet for expelling the metered product from the distribution system, and a distribution outlet separate from the bypass outlet for delivering the metered product to a transfer manifold. The flow control apparatus further includes a bypass closure member movable between a bypass position, in which the valve inlet is in fluid communication with the bypass outlet and isolated from the distribution outlet, and a distribution position, in which the valve inlet is in fluid communication with the distribution outlet and isolated from the bypass outlet. The transfer manifold of the flow control apparatus includes a transfer channel having an open upper end for receiving the metered product when the bypass closure member is in the distribution position, and a closed bottom end opposite the open upper end. The transfer manifold further includes a plurality of transfer outlets. Each of the transfer outlets is in fluid communication with a respective one of a plurality of pneumatic distribution lines. The transfer manifold further includes at least one diverter valve for selectively placing one of the transfer outlets in fluid communication with the transfer inlet and isolating the other transfer outlets from the transfer inlet.

In some examples, the bypass outlet is spaced vertically above the closed bottom end by a vertical offset.

In another aspect, a method of controlling a flow of agricultural product in a distribution system is disclosed. The method includes conveying product from an outlet of a metering device to a valve inlet of a bypass valve. The method further includes moving a bypass closure member of the bypass valve to a distribution position to convey the product to a transfer channel of a transfer manifold. The method further includes adjusting a position of at least one diverter valve in the transfer manifold to direct the product to one of a plurality of pneumatic distribution lines corresponding to the position of the at least one diverter valve. The method further includes temporarily moving the bypass closure member to a bypass position to convey the product to a bypass conduit separate from the transfer channel and expel the product from the distribution system.

In some examples, the method further includes collecting the product expelled from the bypass conduit and measuring its weight to calibrate the metering device.

In some examples, the method further includes expelling the product through the bypass conduit until a tank that supplies the product to the metering device is empty.

Other aspects and features of the teachings disclosed herein will become apparent to those ordinarily skilled in the art, upon review of the following description of the specific examples of the present disclosure.

DRAWINGS

For a better understanding of the described examples and to show more clearly how they may be carried into effect, reference will now be made, by way of example, to the accompanying drawings in which.

The drawings included herewith are for illustrating various examples of apparatuses and methods of the teaching of the present specification and are not intended to limit the scope of what is taught in any way.

DESCRIPTION OF VARIOUS EXAMPLES

Various apparatuses or processes will be described below to provide an example of each claimed invention. No example described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an example of any claimed invention. Any invention disclosed in an apparatus or process described below that is not claimed in this document may be the subject matter of another protective instrument, for example, a continuing patent application, and the applicants, inventors, or owners do not intend to abandon, disclaim, or dedicate to the public any such invention by its disclosure in this document.

Figure 1:
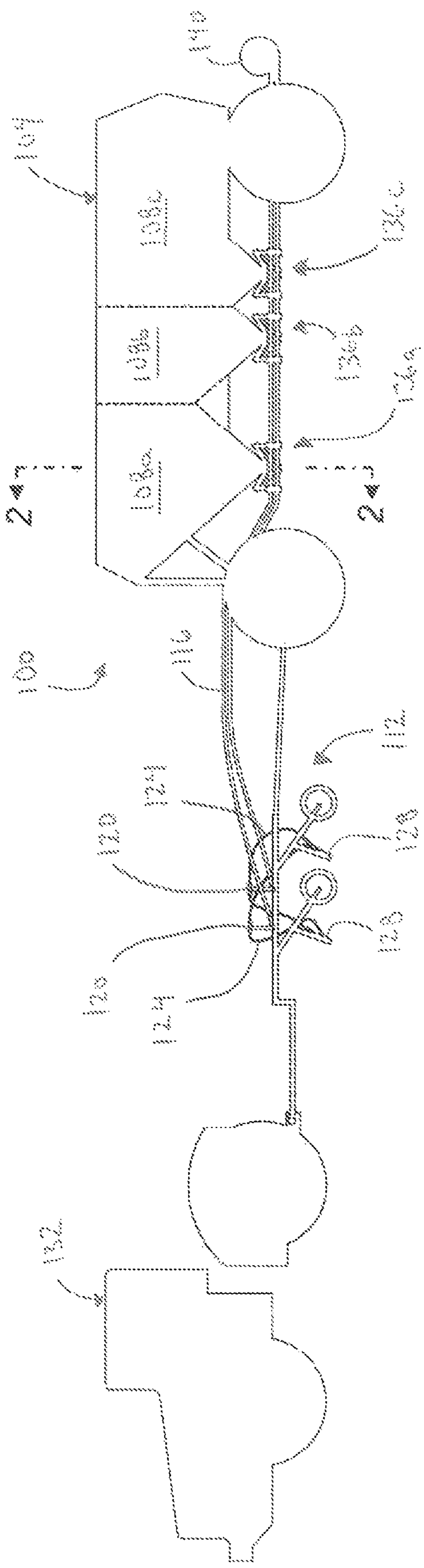
FIG. 1 is a schematic illustration of a distribution system for agricultural product according to aspects of the teaching disclosed herein.

Referring to FIG. 1, a distribution system 100 for applying agricultural product to a field includes an air cart 104. The air cart 104 includes one or more mobile tanks 108, each tank 108 for holding a supply of agricultural product (e.g., seed, fertilizer, etc.). The distribution system 100 further includes a plurality of metering devices to convey the agricultural product from the tanks 108 to an agricultural implement 112 through pneumatic distribution lines 116 extending from the air cart 104. In the example illustrated, the distribution lines 116 (also called primary distribution lines) have downstream ends connected to distribution manifolds 120 mounted on the agricultural implement 112. In the example illustrated, secondary lines 124 extend from the distribution manifolds 120 to delivery boots 128 arranged on the agricultural implement 112 for depositing the agricultural product on the field. In use, the air cart 104 and the agricultural implement 112 are towed by a tractor 132.

In the example illustrated, the air cart 104 includes three mobile tanks **108*a*, 108*b*, and 108*c*, each tank holding a supply of agricultural product. The same product or different products can be held in the tanks 108*a*, 108*b*, and 108*c*. In the example illustrated, each tank holds a distinct product, with tank 108*a* holding a supply of seed, tank 108*b* holding a supply of starter fertilizer, and tank 108*c*** holding a supply of mid-band fertilizer.

The distribution system 100 further includes one or more metering assemblies for conveying agricultural product from the mobile tanks 108 to the agricultural implement 112 through the pneumatic distribution lines 116. In the example illustrated, the distribution system 100 includes three metering assemblies **136*a*, 136*b* and 136*c*. Each metering assembly 136*a*, 136*b* and 136*c* is in communication with a lower end of a respective one of the tanks 108*a*, 108*b*, and 108*c*. In use, each metering assembly 136 controls a rate of transfer of the agricultural product from the respective mobile tank 108 to the distribution lines 116**.

The distribution lines 116 are supplied with an air flow for urging conveyance of the metered product received therein to the agricultural implement 112. In the example illustrated, the source of the supplied air flow is a fan 140 mounted on the air cart 104 and fluidly coupled to upstream ends of each distribution line 116.

Figure 2:
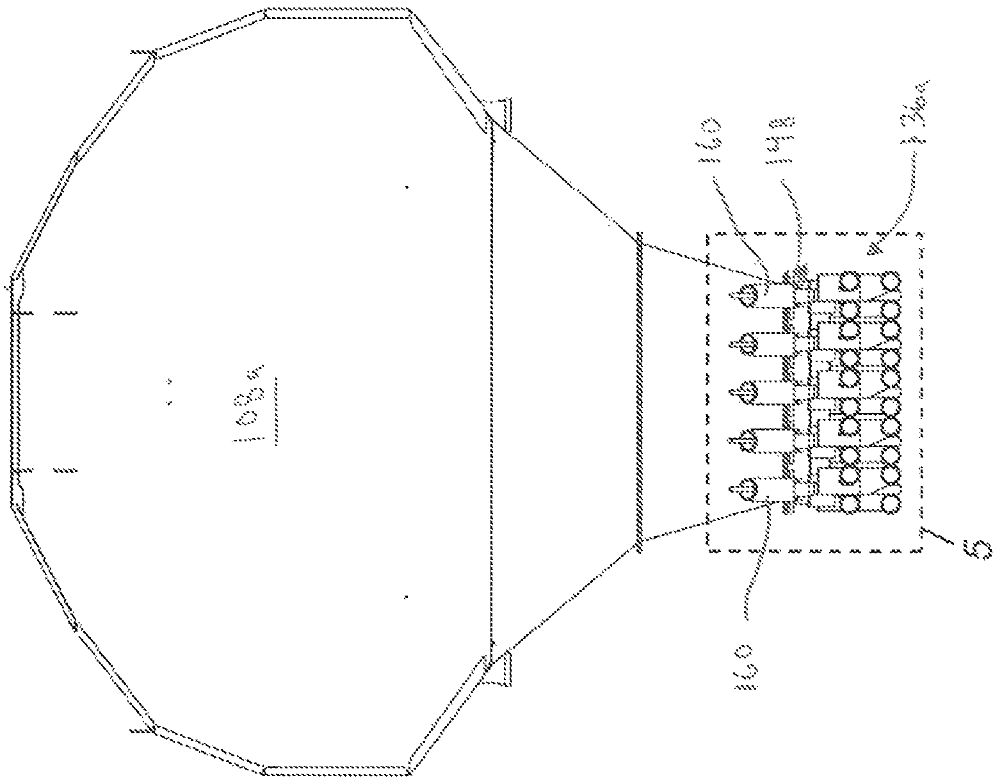
FIG. 2 is a cross-sectional view of a portion of the distribution system of FIG. 1, taken along the line 2-2.

Referring to FIG. 2, in the example illustrated, the tank **108*a* includes a transfer chamber 148 adjacent a lower end of the tank 108*a*, for staging product to be engaged by a plurality of metering devices 160 of the metering assembly 136*a*. In the example illustrated, the transfer chamber 148 is separately secured to a lower end of the tank 108*a***. In some examples, the transfer chamber is disposed within the tank, and can, for example, be defined by a lower portion of the tank interior and is thus adjacent a lower end of the tank.

Figure 3:
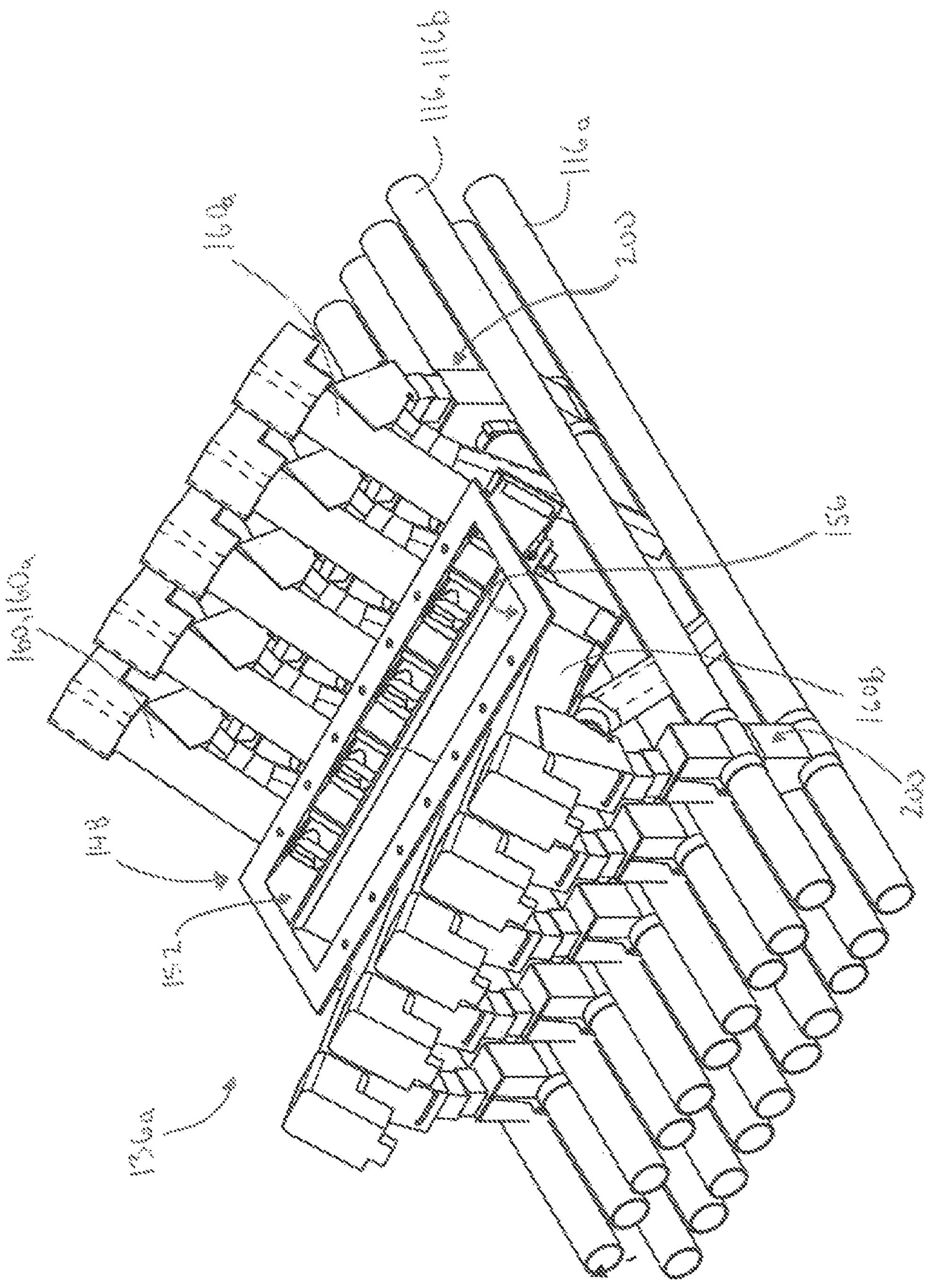
FIG. 3 is an upper front perspective view of a metering assembly of the system of FIG. 1.

Referring to FIG. 3, the transfer chamber 148 has an open upper end 152 for receiving agricultural product into a chamber interior 156. Staged product is withdrawn from the transfer chamber 148 by the plurality of metering devices 160.

Figure 4:
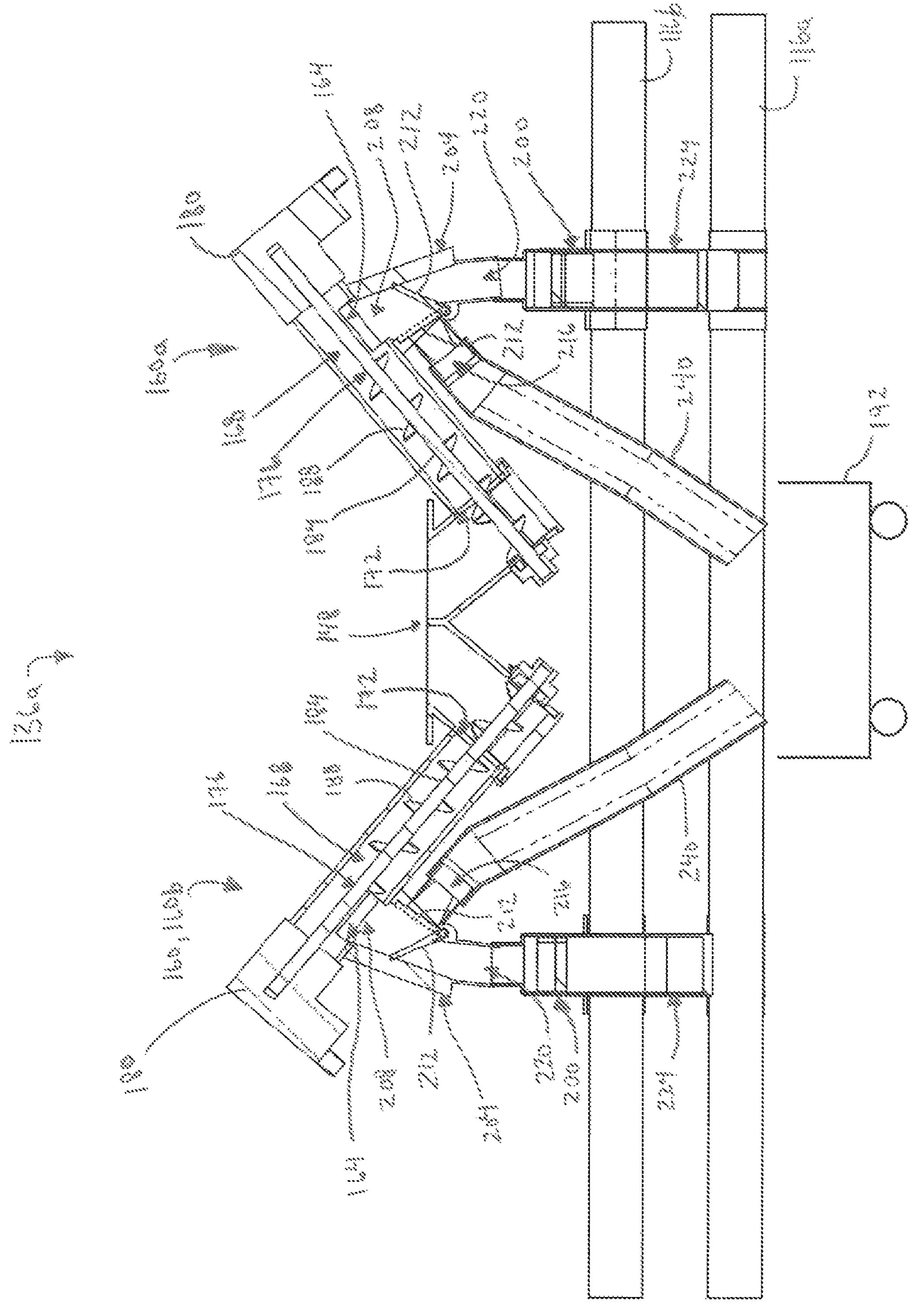
FIG. 4 is a cross-sectional view of the metering assembly of FIG. 3.

Referring to FIG. 4, each metering device 160 has a meter outlet 164 and a rotary propelling member 168 upstream of the meter outlet 164 for urging conveyance of metered product from the transfer chamber 148 to the meter outlet 164. In use, the propelling member 168 of each metering device 160 conveys agricultural product from the transfer chamber 148 to the respective meter outlet 164. In the example illustrated, each propelling member 168 conveys the agricultural product through a respective chamber aperture 172 in the outer wall of the transfer chamber 148 to the respective meter outlet 164. In the example illustrated, the meter outlets 164 are external to the transfer chamber 148.

In the example illustrated, each propelling member 168 includes an auger 176 and a drive motor 180 for urging rotation of the auger 176. Each auger 176 comprises a rotary body with a fluted outer surface in the form of a shaft 184 and at least one helical flight 188 extending along the shaft 184. In alternative examples, the propelling members may include a rotary body in the form of a metering wheel or roller having a fluted outer surface defined by vanes for engaging the product.

The plurality of distribution lines 116, in the example illustrated, includes a lower layer of lower distribution lines **116*a* arranged side-by-side at a common elevation below the transfer chamber 148, and an upper layer of upper distribution lines 116*b* arranged side-by-side at an elevation above the lower layer of lower distribution lines 116*a***.

The meter outlet 164 of each metering device 160 is coupled to a respective one of the lower distribution lines **116*a* and a respective one of the upper distribution lines 116*b*, to selectively distribute metered product from the meter outlet 164 to either one of the respective lower and upper distribution lines 116*a*, 116*b*. In the example illustrated, the respective lower and upper distribution lines 116*a*, 116*b* coupled to each meter outlet 164** are arranged in vertically stacked pairs.

Figure 5:
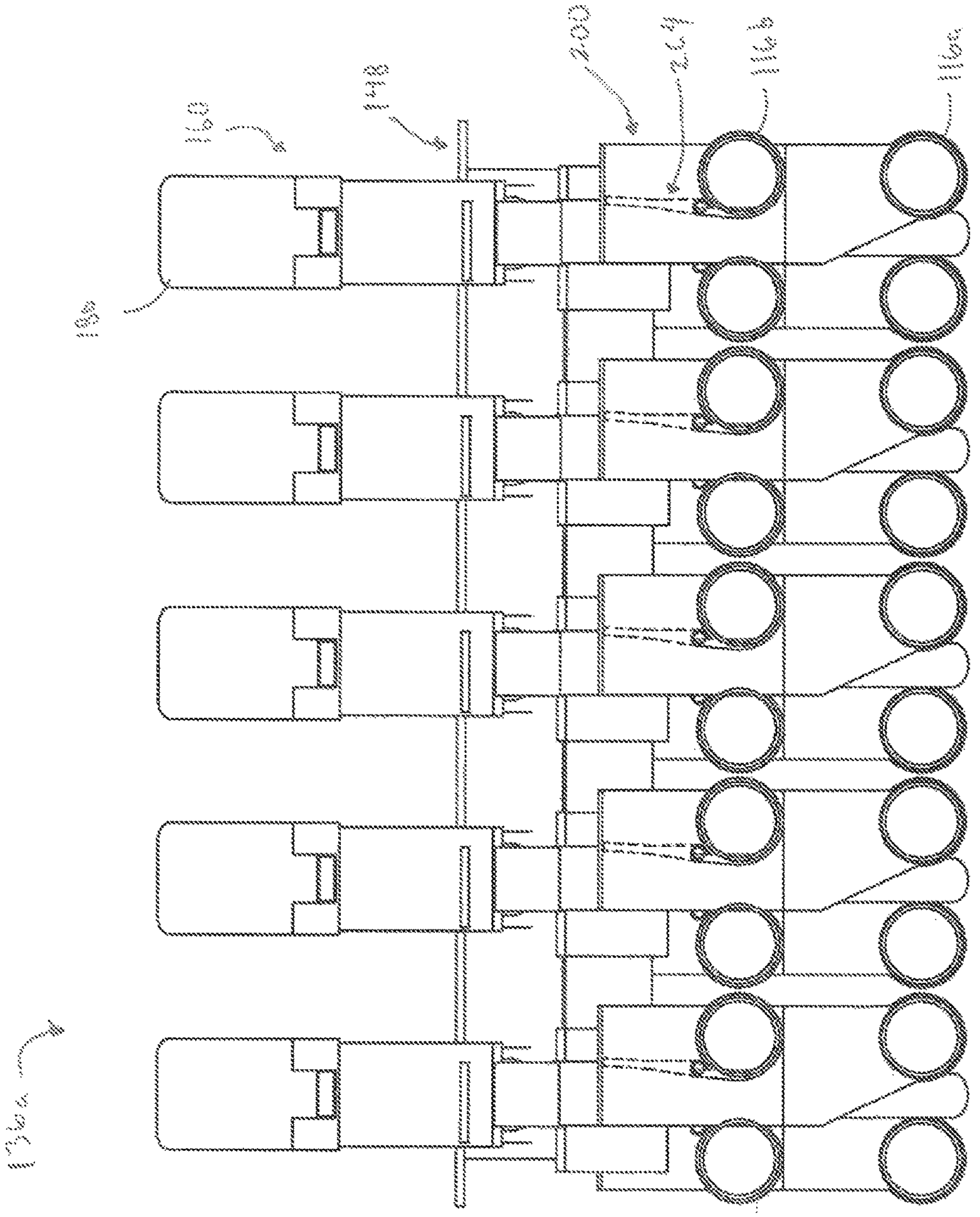
FIG. 5 is a front view of the metering assembly of FIG. 3

With reference to FIG. 5, in the example illustrated, the lower and upper distribution lines **116*a*, 116*b* of each stacked pair are generally vertically aligned. In alternative examples, the lower distribution line 116*a* of a respective stacked pair is horizontally offset from the upper distribution line 116*b* of that stacked pair (i.e., such that a lower axis of the lower distribution line 116*a* and an upper axis of the upper distribution line 116*b*** lie in horizontally spaced-apart vertical planes).

In the example illustrated, the two layers of distribution lines (lower distribution lines **116*a* and upper distribution lines 116*b*) facilitate configuring the distribution system as a "double shoot" system. In some examples, a third, intermediate layer of intermediate distribution lines is provided for configuring the system as a "triple shoot" system. In some examples, the system can be configured as a "single shoot" system, and the distribution lines 116** can be arranged in a single layer.

Referring to FIG. 4, the distribution system 100 further includes a plurality of flow control apparatuses 200 for controlling product flow from the metering devices 160 to the distribution lines 116. In the example illustrated, each flow control apparatus 200 controls product flow from the meter outlet 164 of a respective metering device 160 to the lower and upper distribution lines **116*a*, 116*b* of the respective stacked pair of distribution lines. In accordance with some aspects of the teaching disclose herein, the flow control apparatus 200, in the example illustrated, includes optional tank cleanout and meter calibration features (including, for example, a bypass valve 204), and optional product distribution features (including, for example, a transfer manifold 224 downstream of the bypass valve 204**).

In the example illustrated, the bypass valve 204 accommodates selectively expelling product from the distribution system 100 instead of delivering it to one of the distribution lines **116*a*, 116*b*. The bypass valve 204, in the example illustrated, includes a valve inlet 208 for receiving metered product from the meter outlet 164 of the respective metering device 160, a bypass outlet 216 for expelling the metered product from the distribution system, and a distribution outlet 220 for delivering the metered product to the transfer manifold 224. The bypass valve 204 further includes a bypass closure member 212 movable between a bypass position and a distribution position. The bypass closure member 212 is, in the example illustrated, in the form of a flap that is pivotably movable between the bypass position and the distribution position. In alternative examples, the bypass closure member 212** comprises a gate that is slidable between the bypass position and the distribution position.

When the bypass closure member 212 is in the bypass position (illustrated in solid line in FIG. 4), the valve inlet 208 is in fluid communication with the bypass outlet 216 and is isolated from the distribution outlet 220. When in the bypass position, the bypass closure member 212 prevents flow of metered product from the valve inlet 208 to the transfer manifold 224. In the example illustrated, when in the bypass position, the bypass closure member 212 slopes from the valve inlet 208 toward the bypass outlet 216 to help direct metered product to the bypass outlet 216. When the bypass closure member 212 is in the bypass position, metered product received from the respective metering device flows from the valve inlet 208 to the bypass outlet 216 where it is expelled from the distribution system.

In use, the bypass closure member 212 is temporarily moved from the distribution position to the bypass position to expel agricultural product through the bypass outlet 216 and thereby from the distribution system. The expelled product may be collected in a collection vessel (e.g., for re-use or disposal). The expelled product can also be used for calibration purposes, by comparing the actual amount (e.g., weight) of product expelled by a meter over a set period of time to the expected amount of product expelled based on the length of the set time period and the speed of the meter. Alternatively, or in addition, the bypass outlet 216 can be used to facilitate clean-out (emptying) of the mobile tank 108 (FIG. 2) of any remaining agricultural product after application of a desired amount of agricultural product to the field.

When the bypass closure member 212 is in the distribution position (illustrated in phantom line in FIG. 4), the valve inlet 208 is in fluid communication with the distribution outlet 220 and is isolated from the bypass outlet 216. The bypass closure member 212, when in the distribution position, prevents product outflow through the bypass outlet 216 and allows product outflow through the distribution outlet 220. In the example illustrated, when the bypass closure member 212 is in the distribution position, metered product received from the respective metering device flows from the valve inlet 208, through the distribution outlet 220, to the transfer manifold 224 where it is subsequently directed to one of the lower and upper distribution lines 116*a*, 116*b*.

Figure 7A:
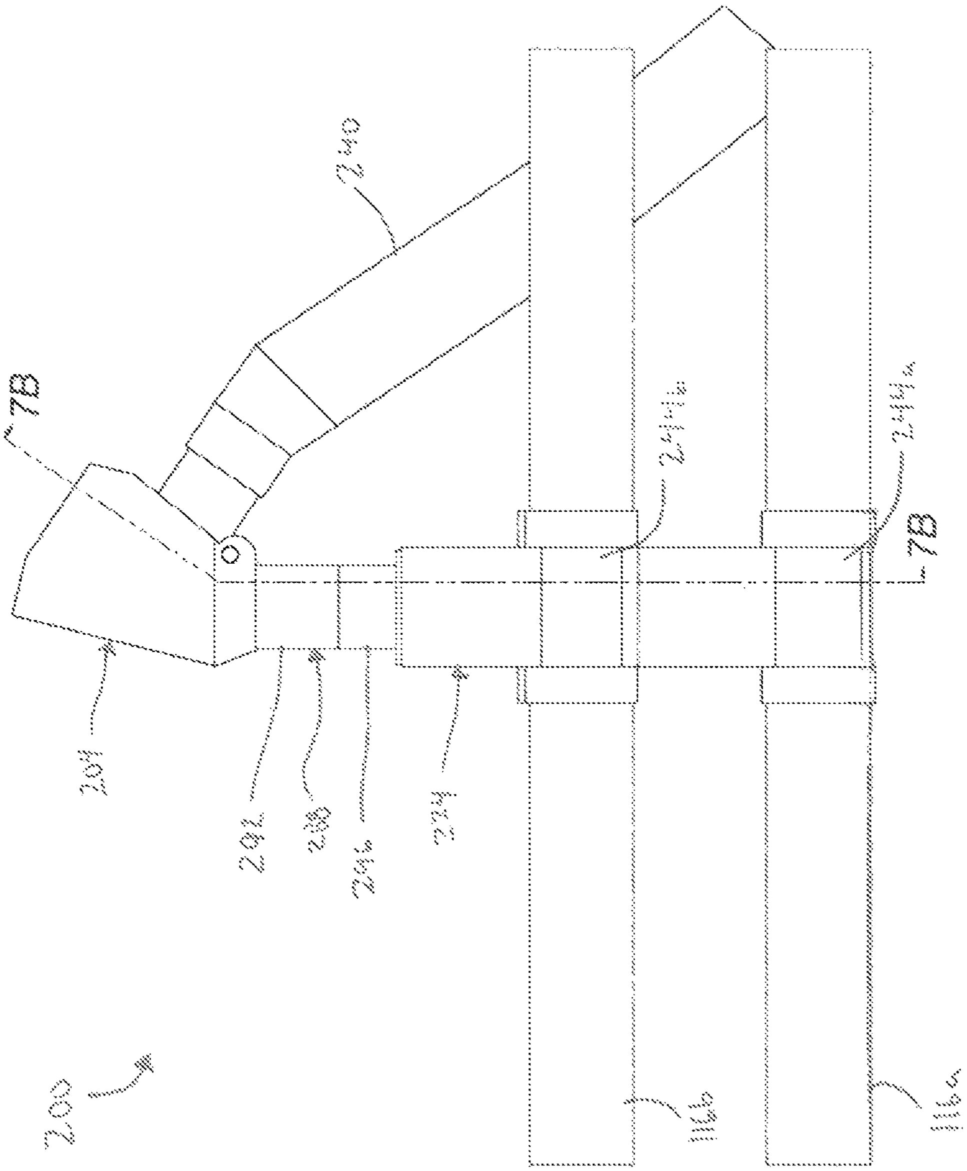
FIG. 7A is a side view of the flow control apparatus of FIG. 6.
Figure 7B:
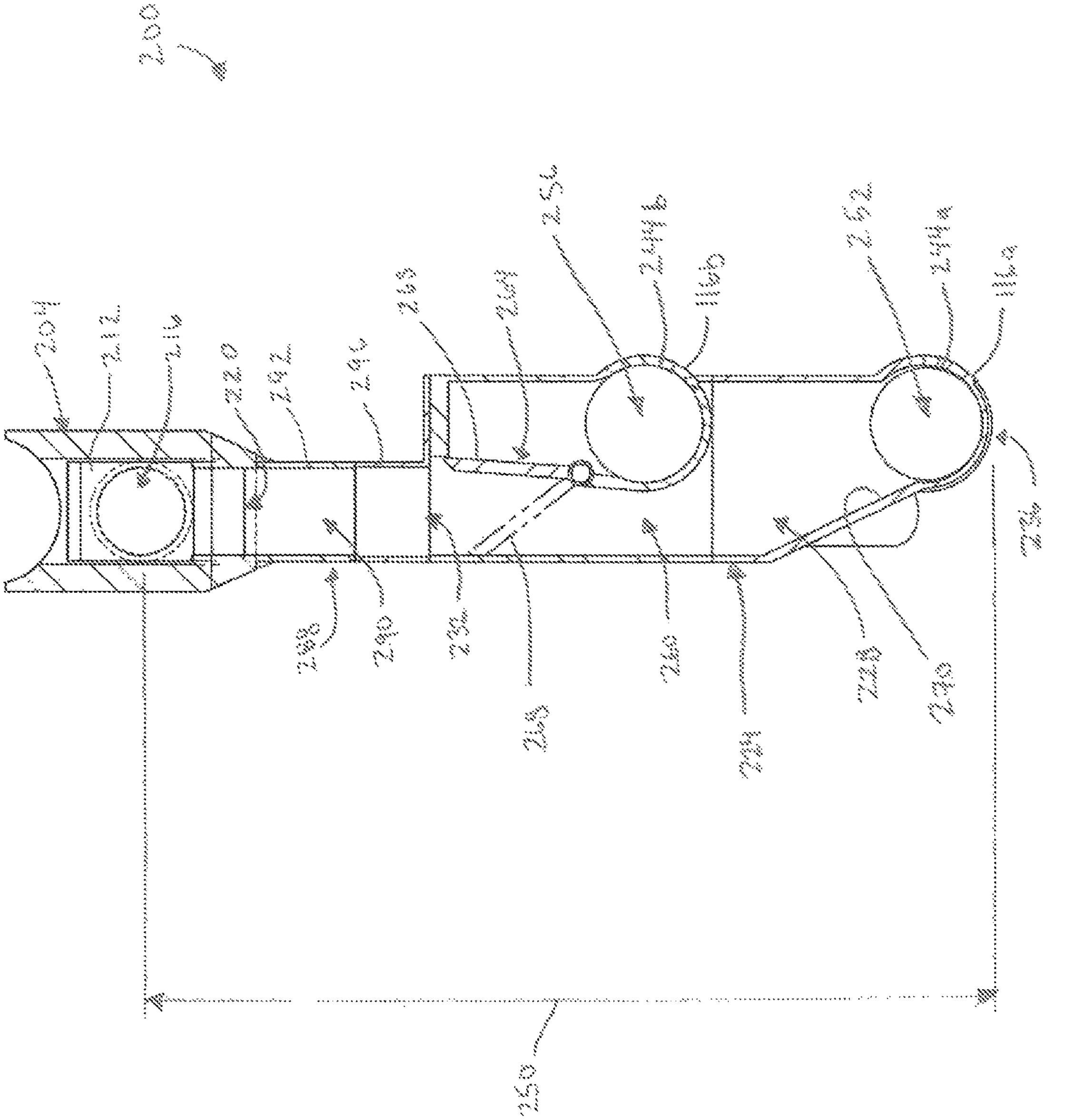
FIG. 7B is a cross-sectional view of the flow control apparatus taken along the line 7B-7B of FIG. 7A.

Referring to FIG. 7B, the transfer manifold 224 includes a transfer channel 228 for receiving the metered product when the bypass valve 204 is in the distribution position. In the example illustrated, the distribution outlet 220 is separate from the bypass outlet 216 and is in fluid communication with the transfer channel 228. The transfer channel 228 has a transfer inlet 232 that is in fluid communication with the distribution outlet 220. In the example illustrated, the transfer inlet 232 is defined by an open upper end of the transfer channel 228 which receives the metered product when the bypass closure member 212 is in the distribution position.

The transfer manifold 224 further includes a plurality of transfer outlets 244. Each transfer outlet 244 is in fluid communication with a respective one of the pneumatic distribution lines 116. In the example illustrated, the plurality of transfer outlets 244 include a lower transfer outlet 244*a* and an upper transfer outlet 244*b* disposed at an elevation above the lower transfer outlet 244*a* and below the transfer inlet 232.

Figure 6:
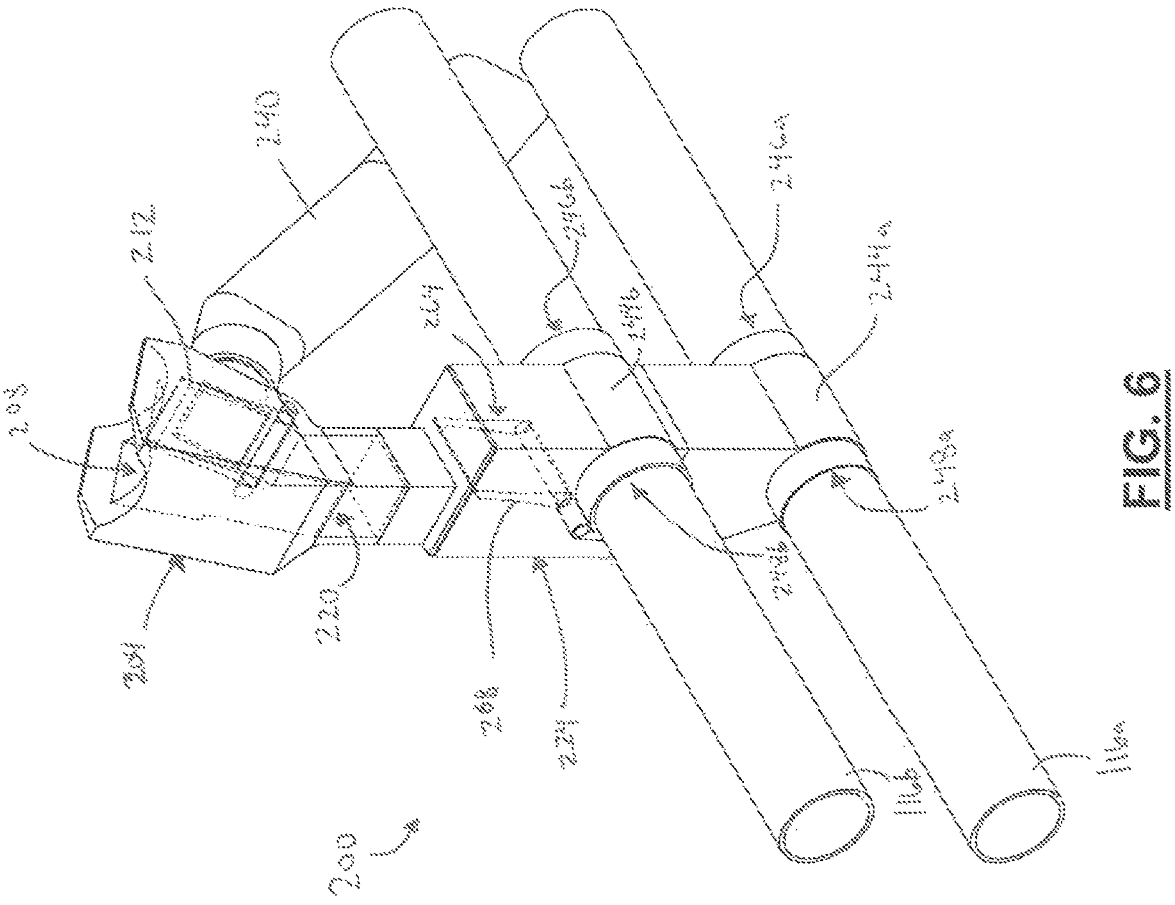
FIG. 6 is an upper front perspective view of a flow control apparatus of the metering assembly of FIG. 3.

Referring to FIG. 6, the lower transfer outlet 244*a* is coupled to the lower distribution line 116*a*, and the upper transfer outlet 244*b* is coupled to an upper distribution line 116*b*. In the example illustrated, the lower transfer outlet 244*a* includes a pair of opposed lower apertures including a lower downstream aperture 246*a* and a lower upstream aperture 248*a*. The lower downstream aperture 246*a* is aligned with, and coupled to, an upstream end of a segment of the lower distribution line 116*a* positioned downstream of the transfer manifold 224. The lower upstream aperture 248*a* is aligned with, and coupled to, a downstream end of a segment of the lower distribution line 116*a* positioned upstream of the transfer manifold 224. Similarly, in the example illustrated, the upper transfer outlet 244*b* includes a pair of opposed upper apertures including an upper downstream aperture 246*b* and an upper upstream aperture 248*b*. The upper downstream aperture 246*b* is aligned with, and coupled to, an upstream end of a segment of the upper distribution line 116*b* positioned downstream of the transfer manifold 224. The upper upstream aperture 248*b* is aligned with, and coupled to, a downstream end of a segment of the upper distribution line 116*b* positioned upstream of the transfer manifold 224.

Referring again to FIG. 7B, in the example illustrated, the flow control apparatus 200 includes a lower transfer zone 252 and an upper transfer zone 256 in the transfer manifold 224. The lower transfer zone 252 is proximate to, and in fluid communication with, the lower transfer outlet 244*a* for transferring metered product to the lower distribution line 116*a* (FIG. 6). The upper transfer zone 256 is proximate to, and in fluid communication with, the upper transfer outlet 244*b* for transferring metered product to the upper distribution line 116*b* (FIG. 6). The upper transfer zone 256 is disposed at an elevation above the lower transfer zone 252. In the example illustrated, the transfer channel 228 extends vertically through the transfer manifold 224 from the transfer inlet 232 to the lower transfer zone 252, and includes a passageway 260 extending beside the upper transfer zone 256.

The flow control apparatus 200 further includes at least one diverter valve for selectively placing the transfer outlets 244*a*, 244*b* into and out of fluid communication with the transfer inlet 232. In the example illustrated, the at least one diverter valve includes a diverter valve 264 having a diverter valve closure member 268. The diverter valve closure member 268 is movable between a closed position and an open position to selectively place one of the lower and upper transfer outlets 244*a*, 244*b* in fluid communication with the transfer inlet 232 and isolate the other of the lower and upper transfer outlets 244*a*, 244*b* from the transfer inlet 232. The diverter valve closure member 268, in the example illustrated, is in the form of a flap that is pivotable between the closed position and the open position. In alternative examples, the diverter valve closure member 268 comprises a gate that is slidable between the open and closed positions.

When the diverter valve closure member 268 is in the closed position (illustrated in solid line in FIG. 7B), the upper transfer zone 256 is isolated from the transfer channel 228 and the passageway 260 is unblocked for delivery of metered product past the upper transfer zone 256 to the lower transfer zone 252. When the diverter valve closure member 268 is in the closed position, metered product received by the transfer inlet 232 flows through the transfer channel 228 to the lower transfer zone 252 where it is transferred to the lower distribution line 116*a* via the lower transfer outlet 244*a*. When the diverter valve closure member 268 is in the closed position, product flow to the upper transfer zone 256 is prevented, thereby preventing product flow to the upper transfer outlet 244*b*.

In the example illustrated, the transfer channel 228 includes an optional inclined lower wall 270 downstream of the passageway 260 to help direct product toward the lower transfer zone 252.

When the diverter valve closure member 268 is in the open position (illustrated in phantom line in FIG. 7B), the upper transfer zone 256 is in fluid communication with the transfer channel 228 and the passageway 260 is blocked. When the diverter valve closure member 268 is in the open position, metered product received by the transfer inlet 232 of the transfer channel 228 flows to the upper transfer zone 256 where it is transferred to the upper distribution line 116*b* via the upper transfer outlet 244*b*. When the diverter valve closure member 268 is in the open position, it prevents product flow to the lower transfer zone 252 and thereby prevents product flow to the lower transfer outlet 244*a*. In the example illustrated, when the diverter valve closure member 268 is in the open position, it slopes toward the upper transfer zone 256 to help direct the metered product to the upper transfer outlet 244*b*.

In some examples, the bypass valve 204 and the transfer manifold 224 are of integral, unitary construction, formed for example within a shared, common housing. In other examples, the bypass valve 204 and the transfer manifold 224 are separate devices spaced apart from each other and connected with a duct to provide flow communication from the bypass valve to the transfer manifold.

With reference to FIGS. 7A and 7B, in the example illustrated, the bypass valve 204 and the transfer manifold 224 are separate devices, connected together by a duct 288 having a hollow interior 290. The duct 288, in the example illustrated, has a duct upper end 292 fixed to the distribution outlet 220 of the bypass valve 204, and a duct lower end 296 fixed to the transfer inlet 232 of the transfer manifold. In the example illustrated, the duct 288 is extensible such that a vertical spacing between the duct upper end and the duct lower end can expand and contract, so that the duct 288 provides a floating (or non-weight bearing) connection between the bypass valve and the transfer manifold. The duct 288, in the example illustrated, accommodates, and is non-resistive to, vertical displacement of the transfer manifold 224 relative to the bypass valve 204, which can help improve the accuracy of weight sensors used to measure and track the weight of the contents of the mobile tanks 108 as the contents are applied to the field. In the example illustrated, the duct upper end 292 and the duct lower end 296 are each rigid tubular elements that are telescopically coupled with one another along a vertical axis. In other examples, the duct upper and lower ends 292, 296 comprise opposite ends of a flexible conduit.

Referring to FIG. 6, in the example illustrated, the flow control apparatus 200 includes an optional bypass conduit 240 downstream of the bypass valve 204 and in fluid communication with the bypass outlet 216. The transfer channel 228 (FIG. 7B), in the example illustrated, is separate from the bypass conduit 240. The bypass conduit 240 receives metered product exiting the bypass outlet 216 when the bypass closure member 212 is in the bypass position (illustrated in solid line in FIG. 4). Agricultural product conveyed through the bypass conduit 240 is expelled from the distribution system. In use, the bypass closure member 212 is temporarily moved to the bypass position to convey product to the bypass conduit 240 and expel that product from the distribution system.

The downstream end of the bypass conduit 240 is, in the example illustrated, positionable above or within a collection vessel (represented schematically at vessel 192 in FIG. 4) so that the expelled product is conveniently deposited therein (e.g., for re-use, disposal and/or meter calibration). The collection vessel 192 would typically have a height not exceeding the elevation of the underside surfaces of the lower distribution lines 116*a*, to facilitate positioning the collection vessel 192 beneath the air cart 104, proximate the metering assembly 136. The inventors have found that increasing the height of the upstream end of the bypass conduit well above the lower distribution lines 116*a* (to provide a vertical offset therebetween) can facilitate routing the bypass conduit 240 so that its downstream end is in a desired location. The flow control apparatus 200, in the example illustrated, is optionally configured to provide such vertical offset.

More particularly, with reference again to FIG. 7B, the bypass outlet 216 (corresponding in height to the upstream end of the bypass conduit 240 (FIG. 7A)) is, in the example illustrated, spaced vertically above the closed bottom end 236 of the transfer channel (corresponding in height to the bottom surface of the lower distribution lines 116*a*) by a vertical offset 250. In some examples, the vertical offset 250 is at least 15 cm, and in some examples is greater than 30 cm. In the example illustrated, the vertical offset 250 is about 40 cm.

Figure 8:
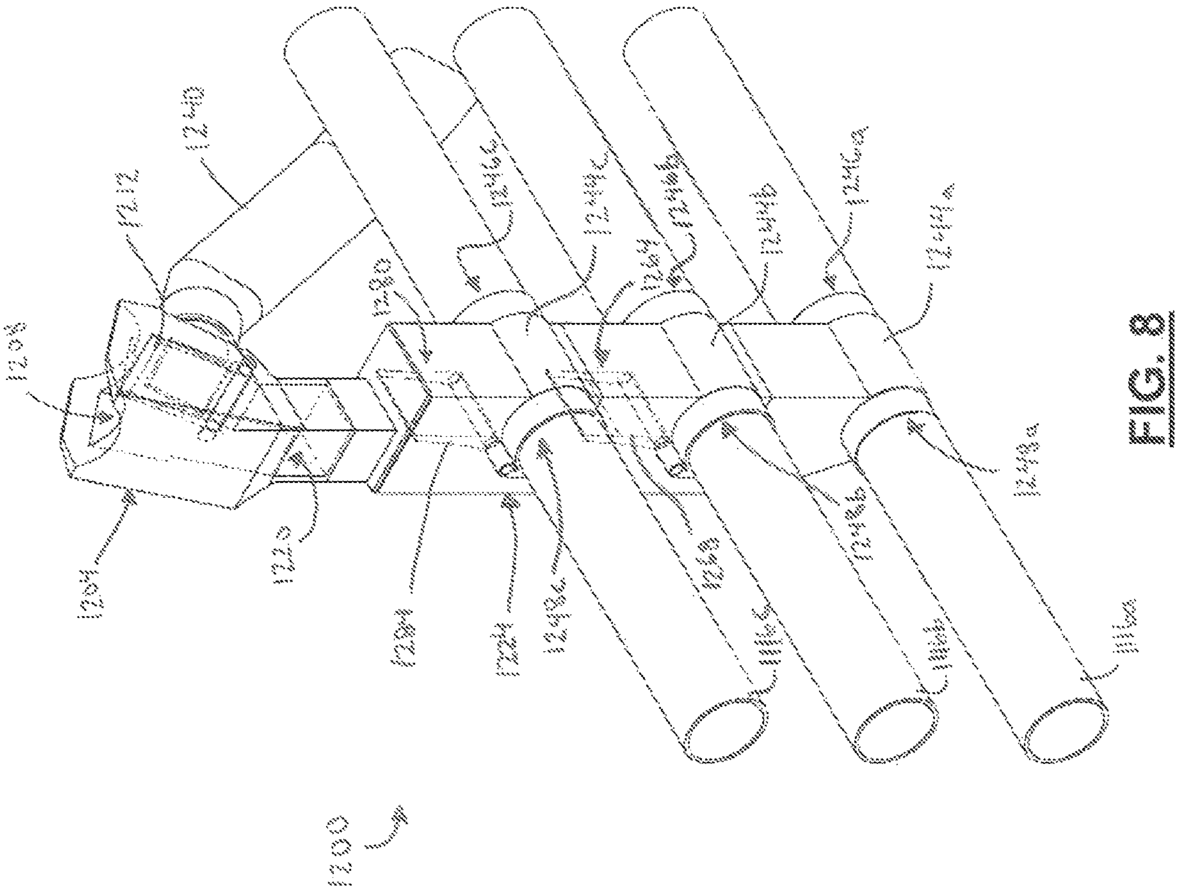
FIG. 8 is an upper front perspective view of another flow control apparatus according to aspects of the teaching disclosed herein.
Figure 9A:
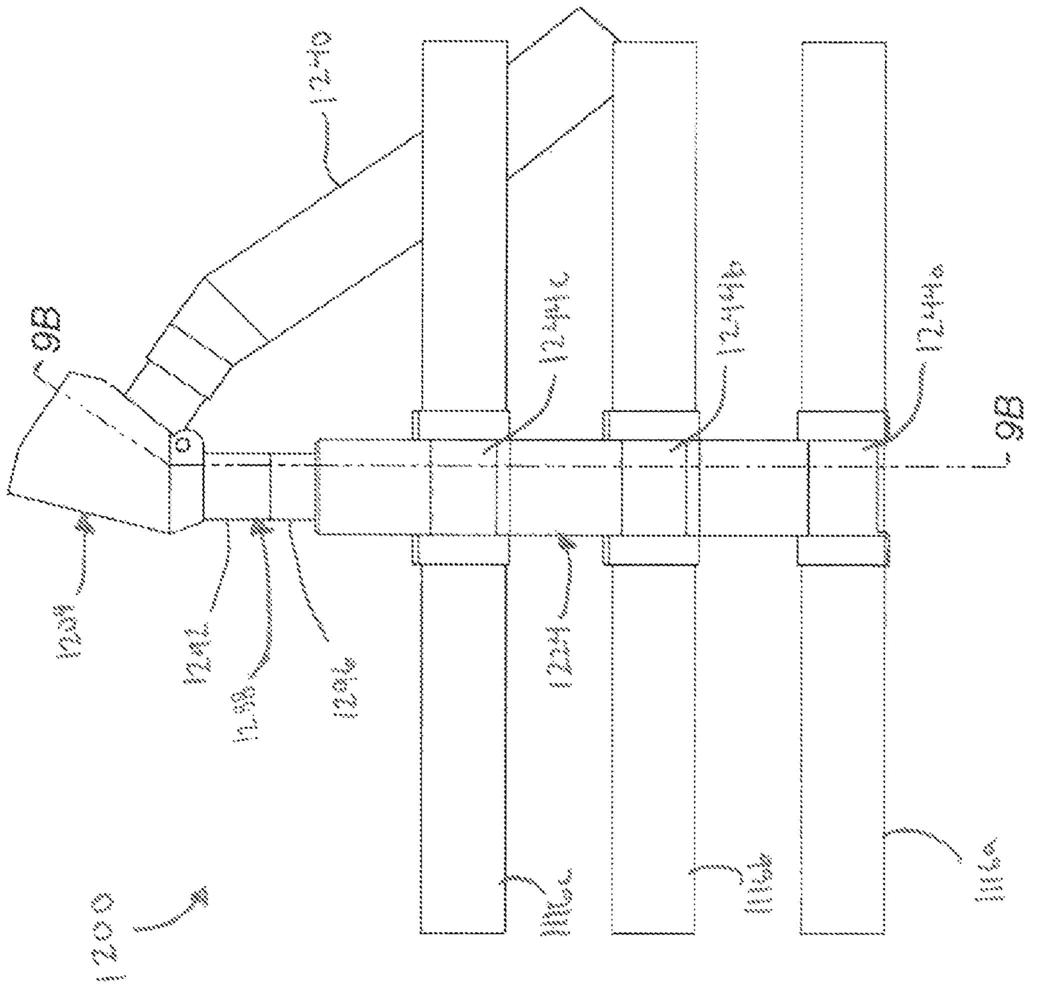
FIG. 9A is a side view of the flow control apparatus of FIG. 8.
Figure 9B:
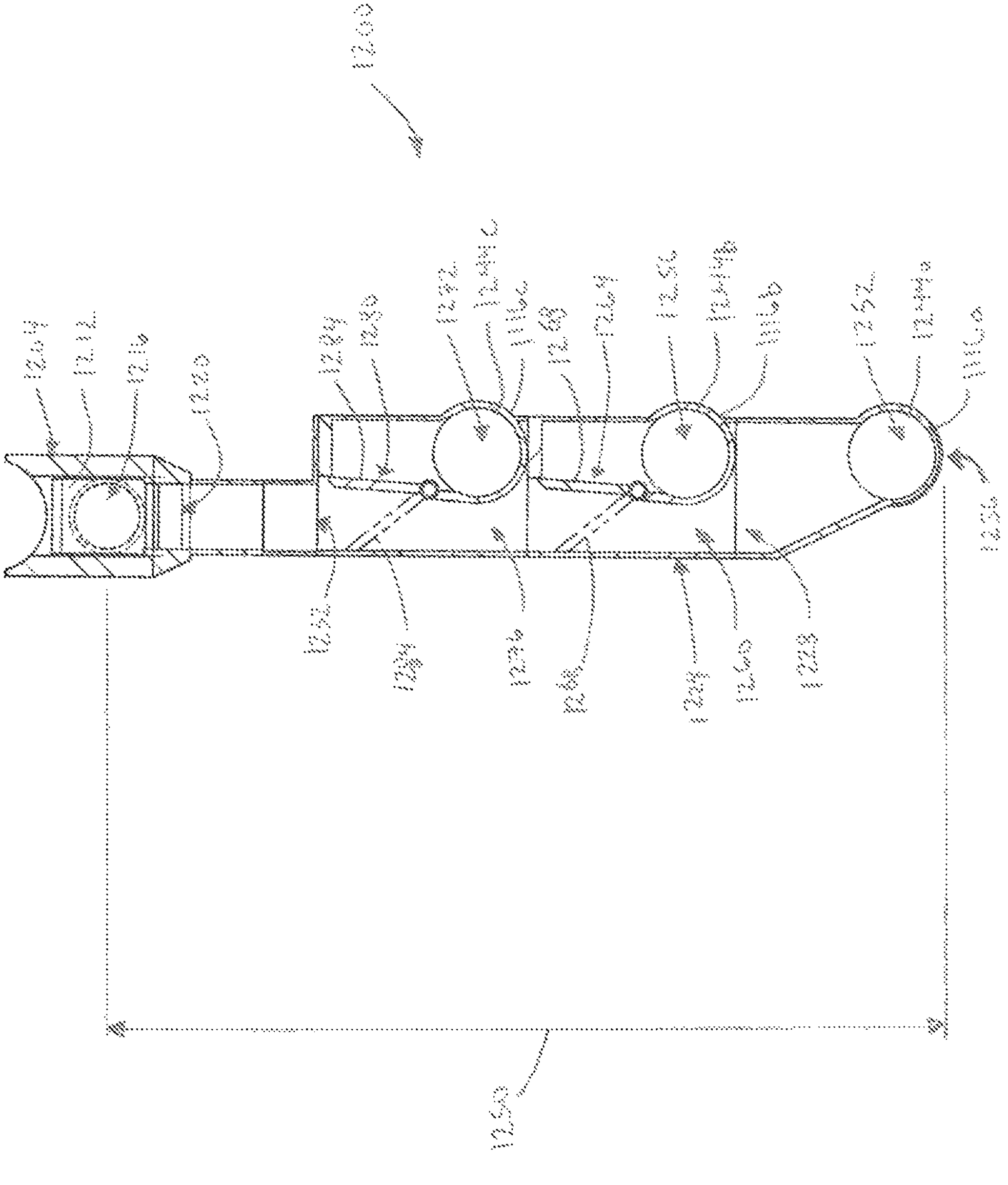
FIG. 9B is a cross-sectional view of the flow control apparatus of taken along the line 9B-9B of FIG. 9A.

Referring to FIGS. 8,9A and 9B, another example of a flow control apparatus 1200 in accordance with aspects of the present teaching has some similarity to the flow control apparatus 200, with like features identified by like reference characters, incremented by 1000.

The flow control apparatus 1200 includes a bypass valve 1204, a transfer manifold 1224, and an optional bypass conduit 1240. In the example illustrated, the bypass valve 1204 includes a valve inlet 1208 for receiving metered product from a respective metering device, a bypass closure member 1212 movable between a bypass position and a distribution position, a bypass outlet 1216 for expelling the metered product from the distribution system, and a distribution outlet 1220 for delivering the metered product to the transfer manifold 1224.

The bypass closure member 1212, in the example illustrated, is in the form of a flap that is pivotable between the bypass position and the distribution position. When the bypass closure member 1212 is in the bypass position, the valve inlet 1208 is in fluid communication with the bypass outlet 1216 and is isolated from the distribution outlet 1220. When the bypass closure member 1212 is in the distribution position, the valve inlet 1208 is in fluid communication with the distribution outlet 1220 and is isolated from the bypass outlet 1216.

In the example illustrated, the transfer manifold 1224 includes a transfer channel 1228 for receiving the metered product when the bypass valve 1204 is in the distribution position. The transfer channel 1228 has an open upper end 1232 for receiving the metered product from the distribution outlet 1220 when the bypass closure member 1212 is in the distribution position, and a closed bottom end 1236 opposite the open upper end 1232.

The transfer manifold 1224 includes a plurality of transfer outlets 1244, including, in the example illustrated, a lower transfer outlet 1244*a* and a first upper transfer outlet 1244*b* disposed at an elevation above the lower transfer outlet 1244*a* and below the open upper end inlet 1232 of the transfer channel 1228. The lower transfer outlet 1244*a* is coupled to a lower distribution line 1116*a*, and the first upper transfer outlet 1244*b* is coupled to a first upper distribution line 1116*b*.

In the example illustrated, the lower transfer outlet 1244*a* includes a pair of opposed lower apertures 1246*a*, 1248*a*. The lower aperture 1246*a* is aligned with, and coupled to, an upstream end of a segment of the lower distribution line 1116*a* positioned downstream of the transfer manifold 1224. The opposed lower aperture 1248*a* is aligned with, and coupled to, a downstream end of a segment of the lower distribution line 1116*a* positioned upstream of the transfer manifold 1224. Similarly, in the example illustrated, the first upper transfer outlet 1244*b* includes a pair of opposed first upper apertures 1246*b*, 1248*b*. The first upper aperture 1246*b* is aligned with, and coupled to, an upstream end of a segment of the first upper distribution line 1116*b* positioned downstream of the transfer manifold 1224. The opposed first upper aperture 1248*b* is aligned with, and coupled to, a downstream end of a segment of the first upper distribution line 1116*b* positioned upstream of the transfer manifold 1224.

The plurality of transfer outlets 1244 further includes, in the example illustrated, a second upper transfer outlet 1244*c* disposed at an elevation above the first upper transfer outlet 1244*b*. The second upper transfer outlet 1244*c* is coupled to a second upper distribution line 1116*c*.

In the example illustrated, the second upper transfer outlet 1244*c* includes a pair of opposed second upper apertures 1246*c*, 1248*c*. The second upper aperture 1246*c* is aligned with, and coupled to, an upstream end of a segment of the second upper distribution line 1116*c* positioned downstream of the transfer manifold 1224. The opposed second upper aperture 1248*c* is aligned with, and coupled to, a downstream end of a segment of the second upper distribution line 1116*c* positioned upstream of the transfer manifold 1224.

In the example illustrated, a lower portion of the lower transfer outlet 1244*a* is defined by the closed bottom end 1236 of the transfer channel 1228. The bypass outlet 1216 is spaced vertically above the closed bottom end 1236 by a vertical offset 1250.

Referring to FIG. 9B, in the example illustrated, the flow control apparatus 1200 includes a lower transfer zone 1252, a first upper transfer zone 1256, and a second upper transfer zone 1272 in the transfer manifold 1224. The lower transfer zone 1252 is proximate to, and in fluid communication with, the lower transfer outlet 1244*a* for transferring metered product to the lower distribution line 1116*a* (FIG. 8). The first upper transfer zone 1256 is proximate to, and in fluid communication with, the first upper transfer outlet 1244*b* for transferring metered product to the first upper distribution line 1116*b* (FIG. 8). The second upper transfer zone 1272 is proximate to, and in fluid communication with, the second upper transfer outlet 1244*c* for transferring metered product to the second upper distribution line 1116*c* (FIG. 8). The second upper transfer zone 1272 is disposed at an elevation above the first upper transfer zone 1256.

In the example illustrated, the transfer channel 1228 extends vertically through the transfer manifold 1224 from the open upper end 1232 to the lower transfer zone 1252, and includes a first passageway 1260 extending beside the first upper transfer zone 1256 and a second passageway 1276 extending beside the second upper transfer zone 1272.

In the example illustrated, the flow control apparatus 1200 includes a first diverter value 1264 and a second diverter valve 1280 for selectively placing the transfer outlets 1244*a*, 1244*b*, 1244*c* into and out of fluid communication with the open upper end 1232 of the transfer channel 1228. The first diverter valve closure member 1268, in the example illustrated, is in the form of a flap that is pivotable between the first closed position and the first open position.

In the example illustrated, the second diverter valve 1280 has a second diverter valve closure member 1284 movable between a second closed position and a second open position. The second diverter valve closure member 1284, in the example illustrated, is in the form of a flap that is pivotable between the second closed position and the second open position. In alternative examples, the second diverter valve closure member 1284 is slidable between the second open and closed positions.

When the second diverter valve closure member 1284 is in the second closed position (illustrated in solid line in FIG. 9B), the second upper transfer zone 1272 is isolated from the transfer channel 1228 and the second passageway 1276 is unblocked. With the second passageway 1276 unblocked by the second diverter value closure member 1284, metered product received by the open upper end 1232 of the transfer channel 1228 flows to one of the first upper transfer zone 1256 and the lower transfer zone 1252 based on the position of the first diverter valve closure member 1268. When the first diverter valve closure member 1268 is in the first closed position (illustrated in solid line in FIG. 9), the metered product in the second passageway 1276 flows to the lower transfer zone 1252 where it is transferred to the lower distribution line 1116*a* via the lower transfer outlet 1244*a*. When the first diverter valve closure member 1268 is in the first open position (illustrated in phantom line in FIG. 9B), the metered product in the second passageway 1276 flows to the first upper transfer zone 1256 where it is transferred to the first upper distribution line 1116*b* via the first upper transfer outlet 1244*b*.

When the second diverter valve closure member 1284 is in the second open position (illustrated in phantom line in FIG. 9B), the second upper transfer zone 1272 is in fluid communication with the transfer channel 1228 and the second passageway 1276 is blocked. When the second diverter valve closure member 1284 is in the second open position, metered product received by the open upper end 1232 of the transfer channel 1228 flows to the second upper transfer zone 1272 where it is transferred to the second upper distribution line 1116*c* via the second upper transfer outlet 1244*c*. When the second diverter valve closure member 1284 is in the second open position, it prevents product flow past the second upper transfer zone 1272 through the second passageway 1276, and thereby prevents product flow toward both the first upper transfer outlet 1244*b* and the lower transfer outlet 1244*a*. In the example illustrated, when the second diverter valve closure member 1284 is in the second open position, it slopes toward the second upper transfer zone 1272 to help direct the metered product to the second upper transfer outlet 1244*c*.

What has been described above is intended to be illustrative of examples of the teaching disclosed herein, without limiting the scope of patent claims granted herefrom. The scope of such claims should be given the broadest interpretation consistent with the description as a whole.

The invention claimed is:

1. A flow control apparatus for an agricultural product distribution system, comprising:

a) a bypass valve having a valve inlet for receiving metered product from a metering device, and a bypass closure member movable between a bypass position and a distribution position;

b) a bypass conduit downstream of the bypass valve for receiving the metered product when the bypass closure member is in the bypass position, to expel the metered product from the distribution system; and c) a transfer manifold downstream of the bypass valve, the transfer manifold including:

i) a transfer channel for receiving the metered product when the bypass closure member is in the distribution position, the transfer channel separate from the bypass conduit;

ii) a plurality of transfer outlets, each of the transfer outlets in fluid communication with a respective one of a plurality of pneumatic distribution lines; and iii) at least one diverter valve for selectively placing at least one of the transfer outlets into fluid communication with the transfer channel and isolating at least one other of the transfer outlets from the transfer channel.

2. The apparatus of claim 1, wherein the bypass valve includes a bypass outlet in fluid communication with the bypass conduit, and a distribution outlet separate from the bypass outlet and in fluid communication with the transfer channel.

3. The apparatus of claim 2, wherein when the bypass closure member is in the bypass position, the valve inlet is in fluid communication with the bypass outlet, and is isolated from the distribution outlet.

4. The apparatus of claim 3, wherein when the bypass closure member is in the distribution position, the valve inlet is in fluid communication with the distribution outlet, and is isolated from the bypass outlet.

5. The apparatus of claim 2, wherein the transfer manifold comprises a transfer inlet in fluid communication with the distribution outlet.

6. The apparatus of claim 5, wherein the plurality of transfer outlets includes a lower transfer outlet and at least a first upper transfer outlet disposed at an elevation above the lower transfer outlet and below the transfer inlet, the lower transfer outlet coupled to a lower distribution line of the plurality of pneumatic distribution lines, and the first upper transfer outlet coupled to a first upper distribution line of the plurality of pneumatic distribution lines.

7. The apparatus of claim 6, further comprising a lower transfer zone in the transfer manifold proximate to, and in fluid communication with, the lower transfer outlet for transferring metered product to the lower distribution line.

8. The apparatus of claim 7, wherein the lower transfer zone comprises a closed bottom end of the transfer channel.

9. The apparatus of claim 7, further comprising a first upper transfer zone in the transfer manifold proximate to, and in fluid communication with, the first upper transfer outlet for transferring metered product to the first upper distribution line, wherein the first upper transfer zone is disposed at an elevation above the lower transfer zone.

10. The apparatus of claim 9, wherein the transfer channel extends vertically through the transfer manifold from the transfer inlet to the lower transfer zone, and comprises a first passageway extending beside the first upper transfer zone.

11. The apparatus of claim 10, wherein the at least one diverter valve comprises a first diverter valve having a first diverter closure member movable between a first closed position, in which the first upper transfer zone is isolated from the transfer channel and the first passageway is unblocked for delivery of metered product past the first upper transfer zone to the lower transfer zone, and a first open position, in which the first upper transfer zone is in fluid communication with the transfer channel and the first passageway is blocked.

12. The apparatus of claim 11, wherein the plurality of transfer outlets further includes a second upper transfer outlet in the transfer manifold disposed at an elevation above the first upper transfer outlet, the second upper transfer outlet coupled to a second upper distribution line of the plurality of pneumatic distribution lines.

13. The apparatus of claim 12, further comprising a second upper transfer zone in the transfer manifold proximate to, and in fluid communication with, the second upper transfer outlet for transferring metered product to the second upper distribution line, wherein the second upper transfer zone is disposed at an elevation above the first upper transfer zone.

14. The apparatus of claim 13, wherein the transfer channel comprises a second passageway extending beside the second upper transfer zone.

15. The apparatus of claim 14, wherein the at least one diverter valve further comprises a second diverter valve having a second diverter closure member movable between a second closed position, in which the second upper transfer zone is isolated from the transfer channel and the second passageway is unblocked, and a second open position, in which the second upper transfer zone is in fluid communication with the transfer channel and the second passageway is blocked.

16. A flow control apparatus for an agricultural product distribution system, comprising:

a) a bypass valve having a valve inlet for receiving metered product from a metering device, a bypass outlet for expelling the metered product from the distribution system, and a distribution outlet separate from the bypass outlet for delivering the metered product to a transfer manifold;

b) a bypass closure member movable between a bypass position, in which the valve inlet is in fluid communication with the bypass outlet and isolated from the distribution outlet, and a distribution position, in which the valve inlet is in fluid communication with the distribution outlet and isolated from the bypass outlet; and c) the transfer manifold, including:

i) a transfer channel having an open upper end for receiving the metered product when the bypass closure member is in the distribution position, and a closed bottom end opposite the open upper end;

ii) a plurality of transfer outlets, each of the transfer outlets in fluid communication with a respective one of a plurality of pneumatic distribution lines; and iii) at least one diverter valve for selectively placing one of the transfer outlets in fluid communication with the transfer inlet and isolating the other transfer outlets from the transfer inlet.

17. The apparatus of claim 16, wherein the bypass outlet is spaced vertically above the closed bottom end by a vertical offset.

18. The flow control apparatus of claim 1, wherein the bypass valve further includes a bypass outlet in fluid communication with the bypass conduit and downstream of the bypass closure member; and, a distribution outlet separate from the bypass outlet and in fluid communication with the transfer channel and disposed downstream of the bypass closure member.

19. A flow control apparatus for an agricultural product distribution system, comprising:

a) a bypass valve having a valve inlet for receiving metered product from a metering device, and a bypass closure member movable between a bypass position and a distribution position;

b) a bypass conduit downstream of the bypass valve for receiving the metered product when the bypass closure member is in the bypass position, to expel the metered product from the distribution system; and c) a transfer manifold downstream of the bypass valve, the transfer manifold including:
   i) a transfer channel for receiving the metered product when the bypass closure member is in the distribution position, the transfer channel separate from the bypass conduit;
   ii) a plurality of transfer outlets, each of the transfer outlets in fluid communication with a respective one of a plurality of pneumatic distribution lines; and
   iii) at least one diverter valve for selectively placing at least one of the transfer outlets into fluid communication with the transfer channel and isolating at least one other of the transfer outlets from the transfer channel;

wherein the bypass valve includes a bypass outlet in fluid communication with the bypass conduit, and a distribution outlet separate from the bypass outlet and in fluid communication with the transfer channel; and wherein when the bypass closure member is in the distribution position, the valve inlet is in fluid communication with the distribution outlet, and is isolated from the bypass outlet.

* * * * *